United States Patent [19]

St. Louis

[11] Patent Number: 5,077,456
[45] Date of Patent: Dec. 31, 1991

[54] PORTABLE DEVICE FOR CUTTING THE INSIDE WALL OF A TUBE BY A CONTINOUS ARC

[75] Inventor: Daniel M. St. Louis, Cambridge, Canada

[73] Assignee: The Babcock & Wilcox Company, New Orleans, La.

[21] Appl. No.: 597,962

[22] Filed: Oct. 15, 1990

[51] Int. Cl.[5] .................... B23K 9/013; B23K 37/02
[52] U.S. Cl. ...................................... 219/69.1; 219/70
[58] Field of Search ............... 219/69.1, 69.11, 69.15, 219/69.16, 69.2, 70

[56] References Cited

U.S. PATENT DOCUMENTS

| | | | |
|---|---|---|---|
| 2,942,092 | 6/1960 | Cammann | 219/69.2 |
| 3,833,785 | 9/1974 | Roach | 219/69.2 |
| 4,259,562 | 3/1981 | Cammann et al. | 219/69.2 |
| 4,476,368 | 10/1984 | Cammann et al. | 219/69.2 |
| 4,804,814 | 2/1989 | Southerland et al. | 219/69.2 |
| 4,916,282 | 4/1990 | Chamming's et al. | 219/69.2 |
| 4,948,933 | 8/1990 | Thompson | 219/69.2 |

Primary Examiner—Geoffrey S. Evans
Attorney, Agent, or Firm—Vytas R. Matas; Robert J. Edwards; Daniel S. Kalka

[57] ABSTRACT

A spark disintegrator tube cutter comprises a housing having a shaft with armature rotatably mounted in the housing. A conductive base which is electrically connected to a post accessible from outside the housing, carries a carbon brush against which the armature slides. The post is used to supply electricity to the shaft. A flexible shaft extension is connected to the shaft and carries a cutting electrode which extends radially outwardly from an end of the shaft. A spacer which is engaged around at least part of the shaft extension on an opposite side from the cutting electrode, and urges the cutting electrode against the inner circumferential surface of the tube to be cut. A pneumatic motor mounted to the housing and connected to the shaft, rotates the shaft. With dc current passing through the cutting electrode, an arc is formed as the electrode slides in continuous contact around the inner circumference of the tube, for cutting the tube.

15 Claims, 2 Drawing Sheets

PORTABLE DEVICE FOR CUTTING THE INSIDE WALL OF A TUBE BY A CONTINOUS ARC

FIELD AND BACKGROUND OF THE INVENTION

The present invention relates in general to metal cutting equipment, and in particular to a new and useful tube cutter which utilizes an electrode rotating in the tube for the purpose of cutting the tube.

An internal tube cutter is known from U.S. Pat. No. 4,476,368. The cutter of this patent is a heavy apparatus which includes two drive mechanisms. One drive mechanism rotates a shaft which carries an electrode. The electrode makes intermittent contact with the inner circumference of the tube. The second drive mechanism rotates a sleeve which is engaged around the electrode shaft for guiding the areas of contact between the electrode and the inner circumference of the tube. It is known to power such an electrode using ac power with the rotation being timed to correspond to positive portions of the ac power wave, during the epicyclic rotation of the electrode.

Such known tube cutters in addition to being heavy and complex, require small components which may break and which are difficult to replace. The device also suffered from the leakage of water coolant which is required for its operation. The need for water tight seals also made the replacement of broken parts more difficult. Also, due to the intermittent contact between the electrode and the inner circumference of the tube, a relatively large amount of electrical power is needed to erode the tube material.

SUMMARY OF THE INVENTION

The present invention comprises a spark disintegrator tube cutter which includes a housing, a shaft with an electrical armature mounted for rotation in the housing and an electrical connection for supplying electrical energy to the shaft. The shaft includes a flexible shaft extension which extends out of the housing and carries a cutting electrode for rotation with the shaft. An insulated spacer mounted on the shaft, at an opposite location from the electrode, maintains the electrode in continuous contact with the inner circumference of the tube to be cut, as the shaft rotates on the tube. Motor means, preferably in the form of a pneumatic motor, are integrally connected to the housing for rotation of the shaft. The housing plus motor combination is small enough so that it can be connected by one person to a tube sheet which carries the tube to be cut. Hooks are advantageously provided on the housing so that the housing can be firmly supported on the tube sheet by expansion bolts extending into nearby tubes and engaged with the housing hooks. A piston is mounted for axial movement in the housing and around the shaft. Passages through the piston allow for coolant to travel from inside the housing, where it cools the housing, through the piston and into the tube around the flexible shaft extension. A gasket at the outer end of the piston engages against the lower end of the tube for sealing the coolant within the tube.

The invention thus has the advantages of simplicity, light portable construction and durability. It finds particular utility in cutting tubes in nuclear steam generators. The housing includes insulators around the armature and its electrical connection for minimizing the risk of short-circuit and electrical shock. Dc power can be supplied by a variety of inexpensive sources such as various tig welders, a heavy duty battery charger or even a simple 12-volt automotive battery.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
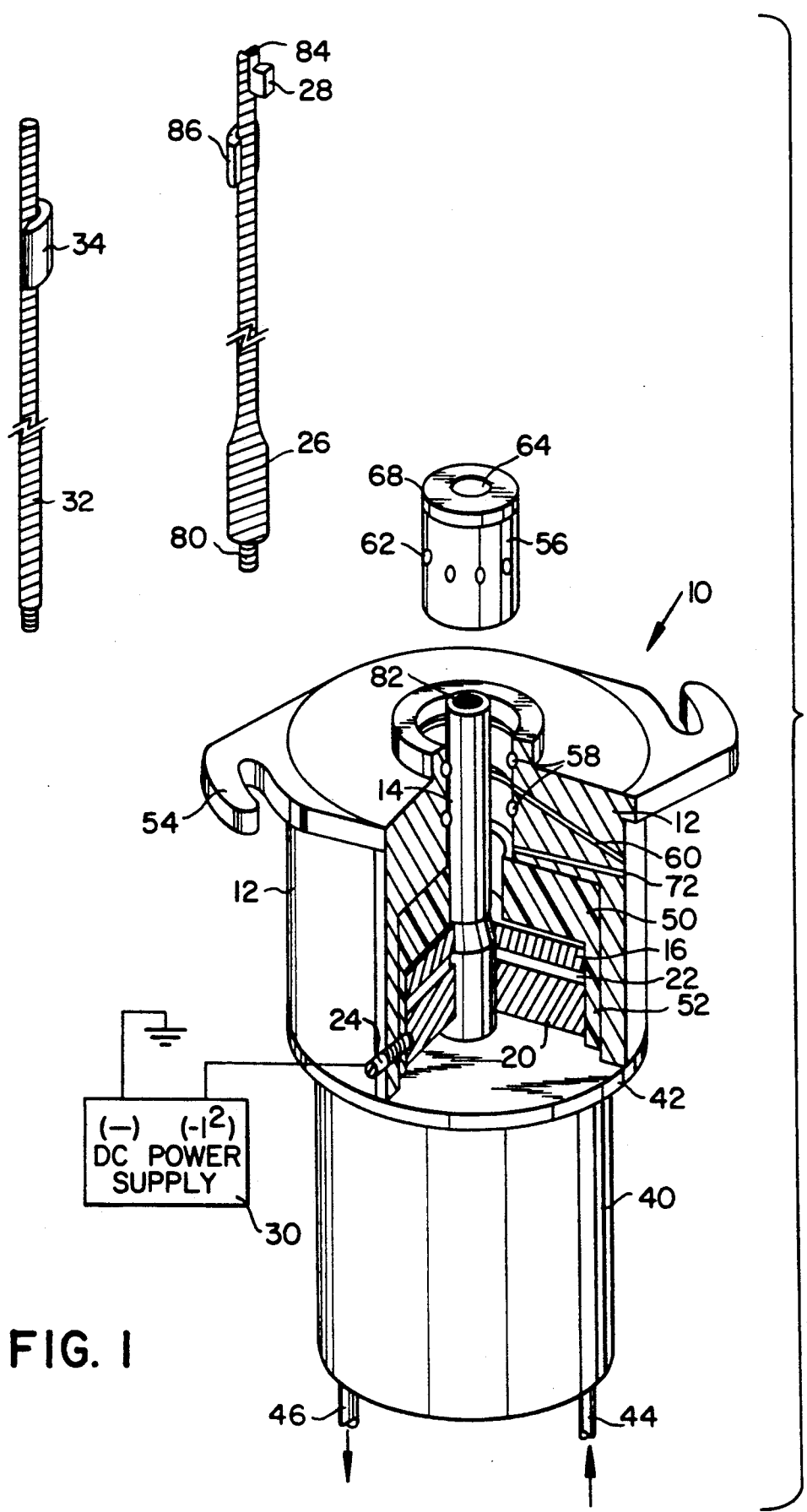
FIG. 1 exploded view, with portions cut away, of the spark disintegrator cutter according to the invention.

Referring to the drawings in particular, the invention embodied in FIG. 1 comprises a spark disintegrator tube cutter generally designated 10 having a housing 12 made of metal or other rugged material. A shaft 14 is mounted for rotation in housing 12 and is driven by a pneumatic motor 40 whose housing is connected through an insulator disk 42, to housing 12. The shaft of motor 40 is directly connected to shaft 14 and rotates when air or other pneumatic fluid is supplied through a pneumatic inlet 44 and discharge through a pneumatic outlet 46.

Figure 2:
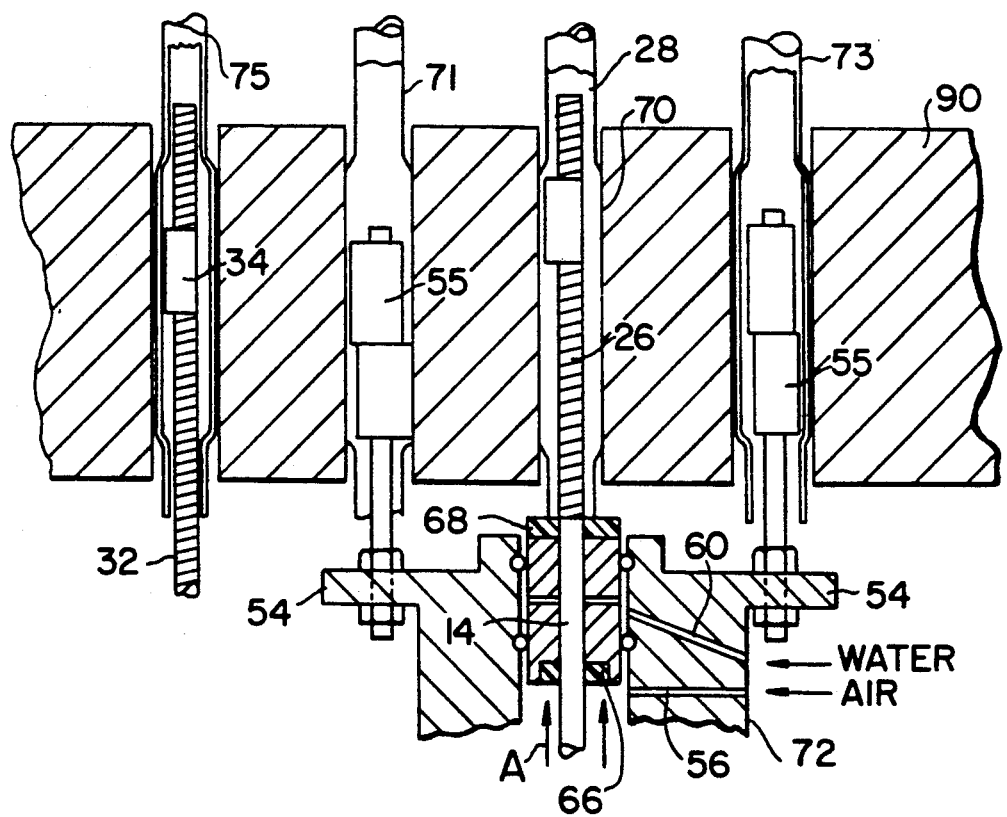
FIG. 2 a partial sectional view of the tube cutter engaged to tubes within a tube sheet for cutting one of the tubes.

An electrically conductive armature 16 is fixed to shaft 14 and makes electrical contact with an annular carbon brush 22 mounted on a conductive base 20 within housing 12. An electrical connector post 24 is threaded into housing 12 and through a cylindrical skirt 52 of an insulator cover 50 fixed in housing 12. Aligned bores in insulator cover 50 and the upper portion of housing 12, define an annular space around shaft 14. Connector hooks 54 extend outwardly from the upper end of housing 12 and are used for connecting the housing 12 to a tube sheet through expansion bolts as will be explained in connection with FIG. 2. A shown nylon piston 56, shown disassembled from housing 12 in FIG. 1 is mounted for axial movement within the upper bore of housing 12 and between a pair of O-rings 58. O-rings 58 seal an annular space between the housing bore and the outer circumference of piston 56. Coolant such as water is supplied through a coolant passage 60 into this annular space and through radial bores 62 in piston 56, into a central bore 64 in the piston. As best shown in FIG. 2, shaft 14 extends through the central bore in piston 56 and defines an annular space therewith. A rubber seal 66 engaged at the lower end of piston 56, seals the lower end of the annular space so that water or other coolant supplied along conduit 60, passes through piston 56, around shaft 14 and upwardly through the upper end of the piston bore 64. A rubber gasket 68 at the upper end of piston 56 is meant to closely engage and seal the lower end of a tube 70 to be cut with the tube cutter of the present invention.

In order to move piston 56 upwardly in the direction of arrows A in FIG. 2, air is supplied through an air conduit 72 into the space defined by housing 12 and below piston 56.

For cutting the inner circumference of tube 70, a flexible shaft extension 26 is fixed to the upper end of shaft 14. This is done for example by a threaded post 80 which is threaded into a threaded bore 82 at the upper end of shaft 14.

Flexible shaft 26 is advantageously constructed of a beryllium-copper spring to which the threaded post 80 is brazed. A rubber coating is advantageously shrunk-fit over the outer surface of shaft extension 26.

A cutting electrode 28 is connected, for example by a set screw 84, to the upper end of flexible shaft extension 26. The electrode is advantageously made of tungsten. A semicylindrical rubber spacer 86 is fixed around part of the circumference of shaft extension 26 just under electrode 28 on an opposite side of the electrode. In this way, with rotation of shaft extension 26 in tube 70, electrode 28 is urged against the inner surface of the tube, for continuous contact to produce a continuous moving arc that cuts the inner circumference of the tube.

To produce the arc, a dc power supply 30 has its positive terminal connected to post 24 and its negative terminal connected to a common ground.

A flexible relaxing electrode shaft 32 which may be constructed similarly to shaft 26 is employed for shrinking or relaxing the enlarged portion of the tube in the tube sheet. This allows the cut tube to be easily removed. A semi-cylindrical relaxing electrode 34 is connected, for example by brazing, around half of the outer circumference of shaft 32. Relaxing electrode 34 may advantageously be made of Inconel tubing which is similar in shape to spacer 86. The relaxing electrode 34 cuts axially around the tube.

In experiments conducted with the invention, various power supplies have been used as dc power supply 30. 1 kW or less power is needed and this can be supplied by a conventional 12-volt automotive battery. Other power supplies that have been used successfully have been a POWER-CON tig welder, and Esab portable tig welder and a heavy duty battery charger.

These are all smaller and less expensive than the conventional ac power supply of about 10 kW, that would be needed for the known disintegrator tube cutters.

As shown in FIG. 2, housing 12 is conveniently mounted under a tube sheet 90 which contains tube 70, by the hooks 54 which are bolted to the ends of expansion bolts 55 which are of conventional design and are fixed within nearby tubes 71 and 73.

In addition to being light, inexpensive to manufacture and operate, the present invention is safe in operation. This is partly due to the fact that the electrical connection for armature 16 is encased between the insulator cover 50 and the insulator disk 42. It is envisionable that the invention may be operated with air being used as the coolant through coolant passage 60, instead of water or other liquid coolant. The danger of electrical shock is minimized because of the various seals which avoid leakage of coolant.

While a specific embodiment of the invention have been shown and described in detail to illustrate the application of the principles of the invention, it will be understood that the invention may be embodied otherwise without departing from such principles.

What is claimed is:

1. A portable spark disintegrator tube cutter comprising:

a housing;
   a shaft mounted for rotation in the housing;
   an armature connected to the shaft and mounted for rotation in the housing;
   a conductive base in said housing;
   a brush fixed to said conductive base against which said armature slides;
   an insulator cover engaged over said armature, said brush and said conductive base in said housing;
   an electrical connector post electrically connected to said conductive base and extending through said housing, adapted to receive a dc power supply with one pole connected to said connector post and an opposite pole connected to a common ground;
   a flexible shaft extension connected to the shaft and extending out of the housing;
   an electrode fixed to and extending radially from an upper end of the shaft extension, said electrode being electrically connected to said armature through said shaft and shaft extension;
   means for electrically insulating said shaft extension from a tube to be cut, said insulating means surrounding an outer surface of said shaft extension;
   means for urging said electrode into continuous contact against an inner surface of the tube to be cut for producing a continuous moving arc for cutting an inner circumference of the tube, said urging means being formed of insulating material for electrically insulating said urging means from the tube to be cut; and
   drive means connected to said shaft for rotating said shaft.

2. A tube cutter according to claim 1 wherein the housing includes an opening therein through which said shaft extends, a piston having a bore therethrough for receiving said shaft, said piston being mounted for axial movement along said shaft in said opening, with said shaft being in said piston bore and defining an annular space between said shaft and said piston, a pneumatic conduit connected to said housing for supplying the pneumatic fluid to said housing for moving said piston outwardly with respect to the housing opening, a coolant conduit connected to said housing for supplying coolant to the annular space between said shaft and said piston, and a seal connected to an outer end of said piston for engagement against an end of a tube to be cut by the tube cutter, so that coolant supplied through the annular space is discharged into the tube to be cut.

3. A tube cutter according to claim 2 including a pair of spaced apart seals in said opening, each seal engaged with said piston for defining a coolant space around said piston in said opening, said piston having at least one radial hole therein extending to said piston bore, said coolant conduit extending to the space in said opening around said piston for supplying coolant through the radial hole and into the piston bore.

4. A tube cutter according to claim 3 wherein said electrode is a relaxing electrode in the form of at least a sector of a cylinder.

5. A tube cutter according to claim 3 wherein said housing includes at least one hook for use in a fixing the housing for cutting of a tube.

6. A tube cutter according to claim 5 wherein said urging means comprises at least a sector of a cylinder fixed around at least part of said flexible shaft extension near said electrode for engagement against an inner surface of a tube to be cut.

7. A tube cutter according to claim 1 wherein said electrode is a relaxing electrode in the form of at least a sector of a cylinder.

8. A tube cutter according to claim 1 wherein said housing includes at least one hook for use in fixing the housing for cutting of a tube.

9. A tube cutter according to claim 1 wherein said urging means comprises at least a sector of a cylinder fixed around at least part of said flexible shaft extension near said electrode for engagement against an inner surface of a tube to be cut.

10. A tube cutter according to claim 1 wherein said shaft extension comprises a flexible spring shaft.

11. A tube cutter according to claim 10, wherein said flexible spring shaft is a beryllium-copper spring.

12. A tube cutter according to claim 10, including a threaded post connected to one end of said flexible shaft extension, said shaft having a threaded opening therein for receiving said threaded post.

13. A tube cutter according to claim 12 including a set screw connected to an opposite end of said shaft extension for fixing said electrode to said shaft extension.

14. A portable spark disintegrator tube cutter, comprising:
a housing;
a shaft mounted for rotation in the housing, said housing having an opening therein through which said shaft extends;
a piston having a bore therethrough for receiving said shaft, said piston being mounted for axial movement along said shaft in said opening with said shaft being in said piston bore and defining an annular space between said shaft and said piston;
a first conduit connected to said housing, said first conduit being adapted to supply a pneumatic fluid to said housing for moving said piston outwardly with respect to the housing opening;
a second conduit connected to said housing, said second conduit being adapted to supply a coolant to the annular space between said shaft and said piston;
a seal connected to an outer end of said piston for engagement against an end of a tube to be cut with the tube cutter, so that coolant supplied through the annular space is discharged into the tube to be cut;
a pair of spaced apart seals in the housing opening, each seal being engaged with said piston for defining a coolant space around said piston in said housing opening, said piston having at least one radial hole therein extending to said piston bore, said conduit adapted for supplying coolant extending to the space in said opening around said piston for supplying coolant through the radial hole and into the piston bore;
an armature connected to the shaft and mounted for rotation in the housing;
a conductive base in said housing;
a brush fixed to said conductive base against which said armature slides;
an insulator cover engaged over said armature, said brush and said conductive base in said housing;
an electrical connector post electrically connected to said conductive base and extending through said housing for supplying electrical power to the shaft;
a flexible shaft extension connected to the shaft and extending out of the housing;
a cutting electrode fixed to and extending radially from an upper end of the shaft extension, said cutting electrode being electrically connected to said armature through said shaft and shaft extension with said shaft extension being electrically insulated from the tube to be cut;
means for urging said cutting electrode into continuous contact against an inner surface of the tube to be cut for producing a continuous moving arc for cutting an inner circumference of the tube, said urging means being formed of insulating material for electrically insulating said urging means from the tube to be cut; and
drive means connected to said shaft rotating said shaft.

15. A portable spark disintegrator tube cutter, comprising:
a housing;
a shaft mounted for rotation in the housing, said housing having an opening therein through which said shaft extends;
a piston having a bore therethrough for receiving said shaft, said piston being mounted for axial movement along said shaft in said opening, with said shaft being in said piston bore and defining an annular space between said shaft and said piston;
a first conduit connected to said housing, said first conduit being adapted to supply a pneumatic fluid to said housing for moving said piston outwardly with respect to the housing opening;
a second conduit connected to said housing, said second conduit being adapted to supply a coolant to the annular space between said shaft and said piston;
a second connected to an outer end of said piston for engagement against an end of a tube to be cut with the tube cutter, so that coolant supplied through the annular space is discharged into the tube to be cut;
a pair of spaced apart seals in the housing opening, each seal being engaged with said piston for defining a coolant space around said piston in said housing opening, said piston having at least one radial hole therein extending to said piston bore, said conduit adapted to supply coolant extending to the space in said opening around said piston for supplying coolant through the radial hole and into the piston bore;
an armature connected to the shaft and mounted for rotation in the housing;
a conductive base in said housing;
a brush fixed to said conductive base against which said armature slides;
an insulator cover engaged over said armature, said brush and said conductive base in said housing;
an electrical connector post electrically connected to said conductive base and extending through said housing for supplying electrical power to the shaft;
a flexible shaft extension connected to the shaft and extending out of the housing;
a relaxing electrode fixed to and extending radially from an upper end of the shaft extension, said relaxing electrode being electrically connected to said armature through said shaft and shaft extension with said shaft extension being electrically insulated from the tube to be cut;
means for urging said relaxing electrode into continuous contact against an inner surface of the tube to be cut for producing a continuous moving arc for cutting an inner circumference of the tube, said urging means being formed of insulating material for electrically insulating said urging means from the tube to be cut; and
drive means connected to said shaft for rotating said shaft.

* * * * *